United States Patent [19]
Duboudin et al.

[11] Patent Number: 5,620,316
[45] Date of Patent: Apr. 15, 1997

[54] WORKING HOLE FOR OXYBURNER, OXYBURNER ASSEMBLY COMPRISING SUCH A WORKING HOLE AND PROCESS FOR USING SUCH AN ASSEMBLY

[75] Inventors: Thierry Duboudin, Versailles, France; Louis Philippe, Oakbrook Terrace, Ill.; Serge Laurenceau, Versailles, France; Eric Duchateau, Clarendon Hills, Ill.; Jean-Yves Iatrides, Saint Maur Des Fosses, France

[73] Assignee: L'Air Liquide, Societe Anonyme Pour L'Etude Et L'Exploitation des Procedes Georges Claude, Paris Cedex, France

[21] Appl. No.: 332,055

[22] Filed: Nov. 1, 1994

[30] Foreign Application Priority Data

Sep. 22, 1994 [FR] France ................................. 94 11332

[51] Int. Cl.$^6$ ....................................................... F23C 5/00
[52] U.S. Cl. ........................... 431/181; 431/159; 431/187; 431/353
[58] Field of Search ................................... 431/187, 353, 431/181, 159, 8

[56] References Cited

U.S. PATENT DOCUMENTS

| | | | |
|---|---|---|---|
| 3,905,751 | 9/1975 | Hemsath et al. | 431/353 X |
| 4,536,152 | 8/1985 | Little, Jr. et al. | 431/159 |
| 4,986,748 | 1/1991 | Brown et al. | 431/188 |
| 5,100,313 | 3/1992 | Anderson | 431/159 X |
| 5,209,656 | 5/1993 | Kobayashi et al. | 431/159 X |
| 5,256,058 | 10/1993 | Slavejkov et al. | 431/353 X |
| 5,431,559 | 7/1995 | Taylor | 431/353 X |
| 5,449,286 | 9/1995 | Snyder et al. | 431/182 X |

*Primary Examiner*—Carl D. Price
*Attorney, Agent, or Firm*—Young & Thompson

[57] ABSTRACT

An oxyburner (1) is associated with an opening (3) comprising a through passage (2) comprising a substantially cylindrical inlet region (5) receiving the downstream end of the oxyburner (1) and a substantially cylindrical outlet region (4) of a diameter $D_s$ and a length $L_s$, the ratio $D_s/D_e$ being comprised between 1.5 and 2.5 and the ratio $L_s/(D_s-D_e)$ comprised between 2 and 7. The speed of ejection of the oxygenated combustible gas is greater than 5 meters/second and the speed of ejection of the combustible gas is greater than the speed of the combustion-supporting gas.

11 Claims, 2 Drawing Sheets

WORKING HOLE FOR OXYBURNER, OXYBURNER ASSEMBLY COMPRISING SUCH A WORKING HOLE AND PROCESS FOR USING SUCH AN ASSEMBLY

FIELD OF THE INVENTION

The present invention relates to oxyburners used in high temperature production furnaces, particularly glass furnaces, and more particularly an opening for a non-cooled oxyburner of the type comprising a block of refractory material formed with a through passage.

BACKGROUND OF THE INVENTION

The openings for non-cooled oxyburners comprise most often a straight cylindrical passage, as described in U.S. Pat. No. 5,267,850 or comprise a flared outlet region, as described in U.S. Pat. No. 5,092,760. In the first case, the combustion taking place in the passage, the speed of the gases leaving the passage and entering the furnace is very high, even in the case in which the speeds of ejection of the combustible agent and of the oxygenated combustible agent are low, which is inconvenient for numerous uses, in particular in glass furnaces. In the second case, the speeds of ejection must be relatively high to cool the passage of the opening and to avoid the return of combustion gases from the furnace into this latter, which also gives rise to excessive outlet speeds.

OBJECT OF THE INVENTION

The present invention has for its object to provide an opening for an oxyburner, and an oxyburner assembly comprising such an opening, permitting reducing the speeds of ejection of the combustible agent and of the oxygenated combustible agent, therefore to reduce the turbulence and to retard the mixing between these components, thereby permitting avoiding the formation of points of elevated temperature in the opening, which generate nitrogen oxides, to increase the luminosity of the flame to provide improved radiant heat transfer, with the speed of the gas at the outlet of the opening maintained at a relatively low level.

SUMMARY OF THE INVENTION

To do this, according to one characteristic of the invention, the passage of the opening comprises a substantially cylindrical outlet region of a diameter $D_s$ and a length $L_s$ connected to a substantially cylindrical inlet region of a diameter $D_e$, the ratio $D_s/D_e$ being comprised between 1.5 and 2.5

According to other characteristics of the invention:

—the ratio $D_s/D_e$ does not exceed 2;

—the ratio $L_s/(D_s/D_e)$ is comprised between 2 and 7, typically between 4 and 6;

—the outlet region comprises a conical upstream portion for connection to the inlet region, having typically a flare angle less than 45° and a length l not exceeding about 15% of the length $L_s$ of the outlet region.

U.S. Pat. No. 3,748,087 discloses an assembly of an air burner and an opening comprising a passage having a short outlet region which is very wide and a long region of small diameter to provide an intimate mixture of the combustible and combustion air at high speed and permitting a precombustion in the outlet region.

The present invention also has for its object an assembly of an oxyburner and an opening as defined above, comprising at least one internal passageway for ejection of combustible and at least one peripheral passageway for ejection of oxygenated combustible whose ends terminate in the inlet region of the opening.

According to another characteristic of the invention, the internal passageway for the combustible opens at the downstream end of the inlet region, at its connection with the outlet region.

The present invention also relates to a process for using such an assembly of oxyburner and opening, in which the oxygenated combustible is ejected at a speed not less than 5 meters/second (m/s) and preferably less than 60 m/s, the combustible being ejected at a speed greater than the speed of ejection of the oxygenated combustible.

BRIEF DESCRIPTION OF THE DRAWINGS

Other characteristics and advantages of the present invention will apparent from the following description of embodiments given by way of non-limiting example, with respect to the accompanying drawings, in which.

DETAILED DESCRIPTION OF THE INVENTION

Figure 1:
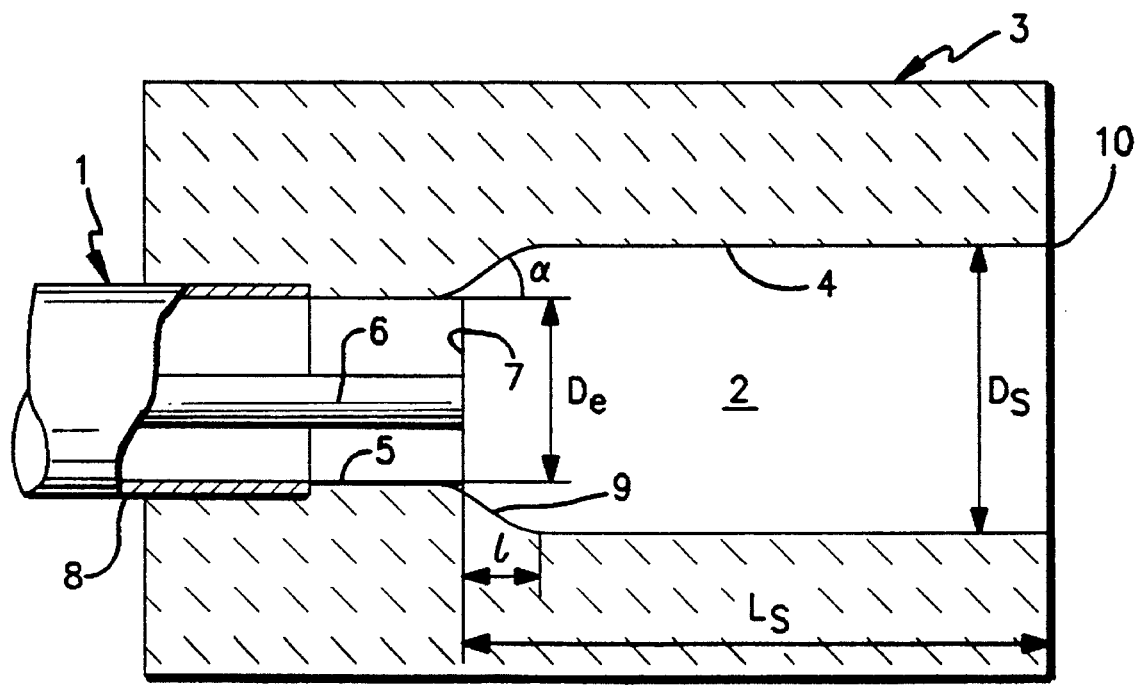
FIG. 1 is a schematic view of a first embodiment of an assembly of oxyburner and opening according to the invention.

In FIG. 1, there is seen the downstream end of an oxyburner 1 extending partially into a through passage 2 of an opening 3 of refractory material and adapted to be mounted in the wall of a furnace (not shown), particularly a glass furnace.

According to the invention, the passage 2 of the opening 3 comprises a substantially cylindrical outlet region 4 of an internal diameter $D_s$ and an axial length $L_s$ connecting to a substantially cylindrical coaxial inlet region 5 of an internal diameter $D_e$. In the illustrated embodiment, the oxyburner 1 comprises at least one central passageway 6 for ejection of gaseous or atomized liquid combustible, coaxial to the inlet region 5 and whose forward or outlet end is substantially coplanar with the outlet plane 7 of the inlet region 5. The oxyburner 1 comprises at least one peripheral conduit 8 for the ejection of oxygenated combustible gas having an oxygen content of at least 5% received within the upstream end of the inlet region 5 and terminating in this latter, at a distance to the rear of the end 7 of the combustible passageway 6. Preferably, the outlet region 4 comprises an upstream portion 9, typically truncated conical with a half angle α and of a length l preferably continuously connecting, without any sharp edges, to the downstream end of the inlet region 5 and to the principal portion of the outlet region 4.

According to one aspect of the invention, the ratio of the diameters $D_s$ and $D_e$ is comprised between about 1.5 and 2.5, preferably less than about 2 and the ratio $L_s/(D_s-D_e)$ of the length of the outlet region to the difference between the diameters of the inlet and outlet regions is comprised between about 2 and 7, typically between about 4 and 6. In the preferred embodiment illustrated, the angle α of the connection region 9 does not exceed 45° and the length l does not exceed 15% of the region $L_s$ and the outlet region 4.

To guarantee sufficient cooling of the oxyburner/opening assembly, the outlet speed of the oxygenated combustible gas in the inlet region 5 is greater than 5 m/s and preferably does not exceed about 60 m/s. Correspondingly, the speed of ejection of the combustible at the end 7 of the passage 6 is comprised between 1 and about 6 times the speed of ejection of the oxygenated combustible gas, typically between 1.5 and 3 times this latter.

Figure 2:
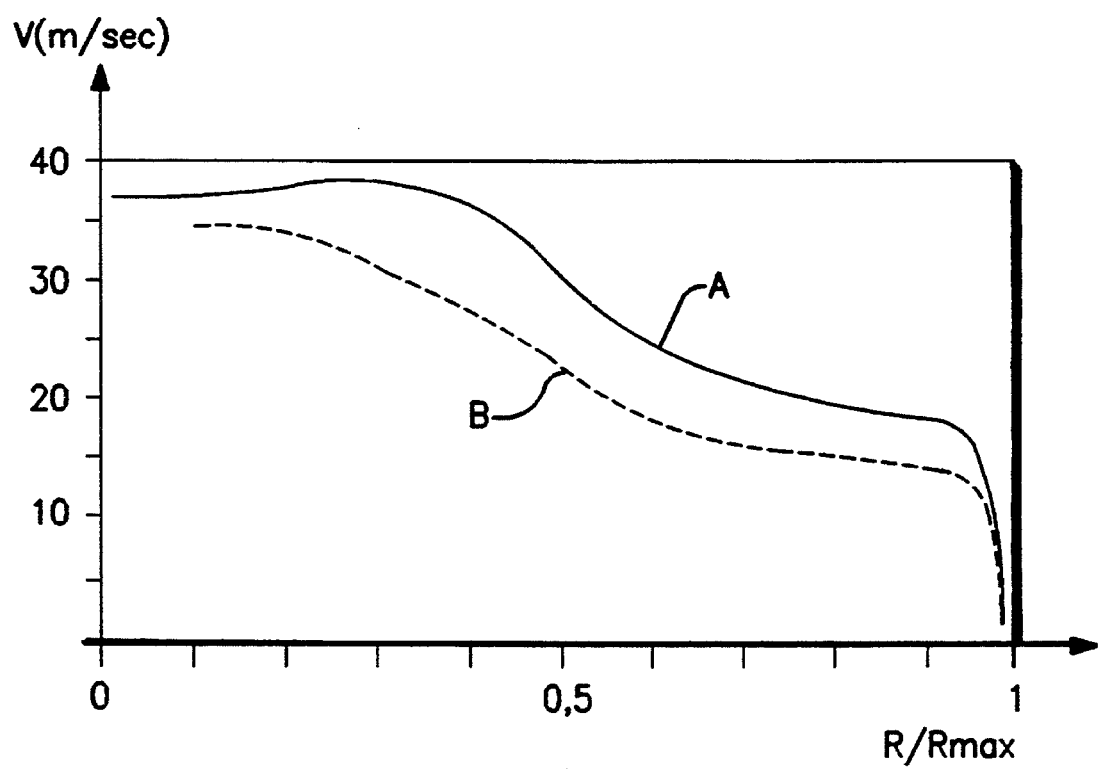
FIG. 2 is a curve showing the profile of the speeds of the gas leaving the opening of the assemblies according to FIG. 1.

There is shown in FIG. 2, the profile of the axial speeds of the combustion gases in the plane of the outlet 10 of the outlet region 4, the ordinates being the axial speed in meters/second and the abscissae the location of a point in the outlet plane determined by the region between its radius relative to the axis and the maximum radius (equal to $D_s/2$), with an ejection speed of natural gas of 30 m/s and an ejection speed of impure oxygen of 15 m/s, and with two opening geometries A and B according to the following table:

|   | $D_c$ | $D_s$ | $L_s$ | $D_s/D_c$ | $L(D_s - D_c)$ |
|---|---|---|---|---|---|
| A | 35 | 52 | 120 | 1.5 | 7 |
| B | 35 | 60 | 120 | 1.7 | 4.8 |

As is seen in FIG. 2, the axial speed of the combustion gases at the outlet of the opening nowhere exceeds 40 m/s but remains greater than 10 m/s up to the immediate vicinity of the limit layer along the walls of the outlet region 4.

Figure 3:
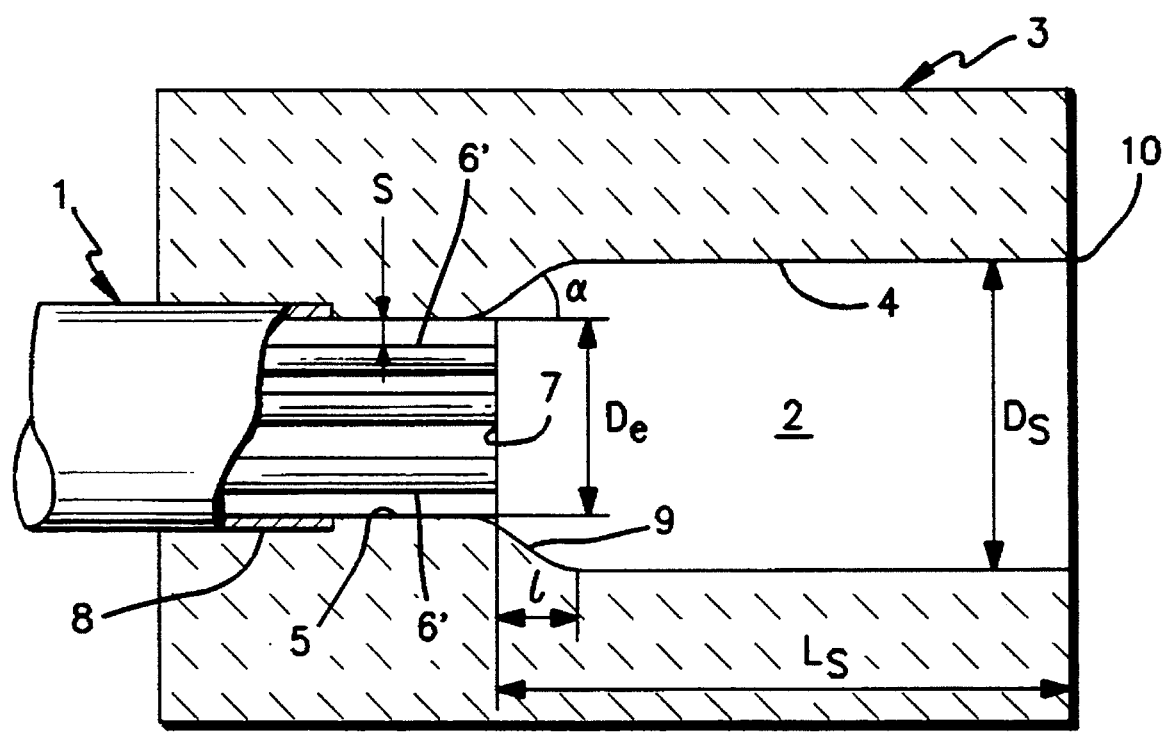
FIG. 3 is a schematic view, analogous to FIG. 1, of a second embodiment of an assembly of oxyburner and opening according to the invention.

FIG. 3 shows an embodiment of an oxyburner assembly according to the invention comprising at least two, typically at least three, passages 6' for ejection of combustible, whose outlets are all coplanar with the plane 7 at the outlet of the inlet region 5. Typically, the oxyburner comprises five (as shown) or seven conduits 7' angularly spaced about the axis of the inlet region 5. The multi-tube injectors have been able to be industrially developed by reason of the risks of local overheating of the opening block in the region of the regenerators adjacent the injection conduits because of the approach of these latter to the wall of the opening in comparison to the embodiment with a central conduit. The stepped cylindrical configuration of the opening according to the invention permits considerably reducing these risks. To reduce them substantially, according to one aspect of the invention, the minimum distance s between an internal conduit 6' and the adjacent wall of the inlet region 5 of the opening is determined as a function of the dimensions of the outlet region 4 of the opening according to the following relationship:

$$L_s/(s+(D_s-D_2)/2)$$

comprised between 6 and 8.

This relationship expresses the fact that combustible ejected by a pipe 6' with a theoretical ejection cone with a half angle of opening of about 6°, will not strike the internal wall of the outlet region 4 but would strike a theoretical prolongation of this latter at a point located at an optimal distance from the end 10 of the opening.

Although the present invention has been described with respect to particular embodiments, it is not thereby limited but is on the contrary susceptible of modifications and variations which will be apparent to those skilled in the art, within the scope of the following claims.

We claim:

1. Opening for an oxyburner, comprising a block of refractory material formed with a through passage, said passage comprising a substantially cylindrical outlet region of a diameter $D_s$ and a length $L_s$, connecting to a substantially cylindrical inlet region of a diameter $D_s$, the ratio $D_s/D_e$ being comprised between 1.5 and 2.5, and the ratio $L_s/(D_s-D_e)$ being comprised between 2 and 7.

2. Opening according to claim 1, wherein the ratio $D_s/D_e$ does not exceed 2.

3. Opening according to claim 1, wherein the ratio $L_s/(D_s-D_e)$ is comprised between 4 and 6.

4. Opening according to claim 1, wherein said outlet region comprises a truncated conical upstream portion connecting to the inlet region.

5. Opening according to claim 4, wherein said truncated conical portion has an opening half angle α not exceeding 45°.

6. Opening according to claim 5, wherein the length l of the truncated conical portion does not exceed 15% of the length $L_s$ of the outlet section.

7. The assembly of an oxyburner and an opening according to claim 1, wherein the oxyburner comprises at least one internal passage for ejection of combustible, and at least one peripheral passage for ejection of oxygenated combustible opening into said inlet region.

8. Assembly according to claim 7, wherein said internal passage for combustible opens at the downstream end of the inlet region.

9. Assembly according to claim 7, which further comprises at least two internal passages, each spaced from the wall of the internal region by a distance s such that:

$$L_s/(s+(D_s-D_2)/2)$$

is comprised between 6 and 8.

10. Process for using an assembly according to claim 7, wherein a combustible gas is ejected comprising at least 85% oxygen at a speed greater than 5 m/s and wherein a combustible gas is ejected at a speed at least equal to that of the combustion-supporting gas.

11. Process according to claim 10, wherein the combustible is ejected at a speed not exceeding six times the speed of the combustion-supporting gas.

* * * * *